United States Patent
Ewing et al.

(10) Patent No.: US 9,464,748 B2
(45) Date of Patent: Oct. 11, 2016

(54) TUBULAR OCCLUSION AND PRESSURE DAMPING SYSTEM AND TEMPORAL PRESSURE CONTROLLING ARRANGEMENT

(71) Applicants: Daniel C. Ewing, Katy, TX (US); Christopher Ryan Hern, Kingwood, TX (US); Matthew J. Krueger, Houston, TX (US)

(72) Inventors: Daniel C. Ewing, Katy, TX (US); Christopher Ryan Hern, Kingwood, TX (US); Matthew J. Krueger, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 122 days.

(21) Appl. No.: 14/521,070

(22) Filed: Oct. 22, 2014

(65) Prior Publication Data

US 2016/0116098 A1    Apr. 28, 2016

(51) Int. Cl.

| | |
|---|---|
| *E21B 33/16* | (2006.01) |
| *F16L 55/04* | (2006.01) |
| *E21B 1/00* | (2006.01) |
| *F16K 1/00* | (2006.01) |
| *E21B 33/134* | (2006.01) |
| *E21B 33/13* | (2006.01) |

(52) U.S. Cl.
CPC .................. *F16L 55/04* (2013.01); *E21B 1/00* (2013.01); *F16K 1/00* (2013.01); *E21B 33/13* (2013.01); *E21B 33/134* (2013.01); *E21B 33/16* (2013.01)

(58) Field of Classification Search
CPC ....... E21B 33/16; E21B 33/134; E21B 33/13
USPC ............. 137/68.19, 68.22, 504; 251/230, 94
See application file for complete search history.

(56) References Cited

U.S. PATENT DOCUMENTS

| | | | |
|---|---|---|---|
| 3,345,915 A * | 10/1967 | Dotto .................... | F15B 15/061 |
| | | | 137/624.13 |
| 6,634,428 B2 | 10/2003 | Krauss et al. | |
| 8,245,788 B2 | 8/2012 | Garcia et al. | |
| 8,316,951 B2 | 11/2012 | Fay et al. | |
| 2011/0079295 A1* | 4/2011 | Nunez .................... | B65D 90/34 |
| | | | 137/347 |

* cited by examiner

*Primary Examiner* — Michael R Reid
*Assistant Examiner* — Paul J Gray
(74) *Attorney, Agent, or Firm* — Cantor Colburn LLP

(57) ABSTRACT

A tubular occlusion and pressure damping system includes, a tubular, an occlusion configured to block flow through the tubular, the occlusion having, a first chamber in pressure communication with an inside of the tubular, a second chamber in fluidic communication with the first chamber, and a flow restrictor in operable communication with the first chamber and the second chamber. The flow restrictor configured to throttle flow between the first chamber and the second chamber such that pressure increases within the second chamber lag behind pressure increases in the inside of the tubular at least until the second chamber has reached a selected volume after which pressure within the second chamber increases toward the pressure in the inside of the tubular.

17 Claims, 2 Drawing Sheets

TUBULAR OCCLUSION AND PRESSURE DAMPING SYSTEM AND TEMPORAL PRESSURE CONTROLLING ARRANGEMENT

BACKGROUND

Temporarily blocking flow through a tubular is a typical method employed to perform an action. Such actions may be actuated by pressure built against the temporary blockage. Several options exist to allow for the removal of the temporary blockage. Some include drilling or milling out the temporary blockage while others include exposing the blockage to an environment that causes the blockage to dissolve over time. Although these options serve the purpose for which they were designed, the art is always receptive to new systems that allow for temporarily blocking flow through a tubular.

BRIEF DESCRIPTION

Disclosed herein is a tubular occlusion and pressure damping system. The system includes, a tubular, an occlusion configured to block flow through the tubular, the occlusion having, a first chamber in pressure communication with an inside of the tubular, a second chamber in fluidic communication with the first chamber, and a flow restrictor in operable communication with the first chamber and the second chamber. The flow restrictor configured to throttle flow between the first chamber and the second chamber such that pressure increases within the second chamber lag behind pressure increases in the inside of the tubular at least until the second chamber has reached a selected volume after which pressure within the second chamber increases toward the pressure in the inside of the tubular.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
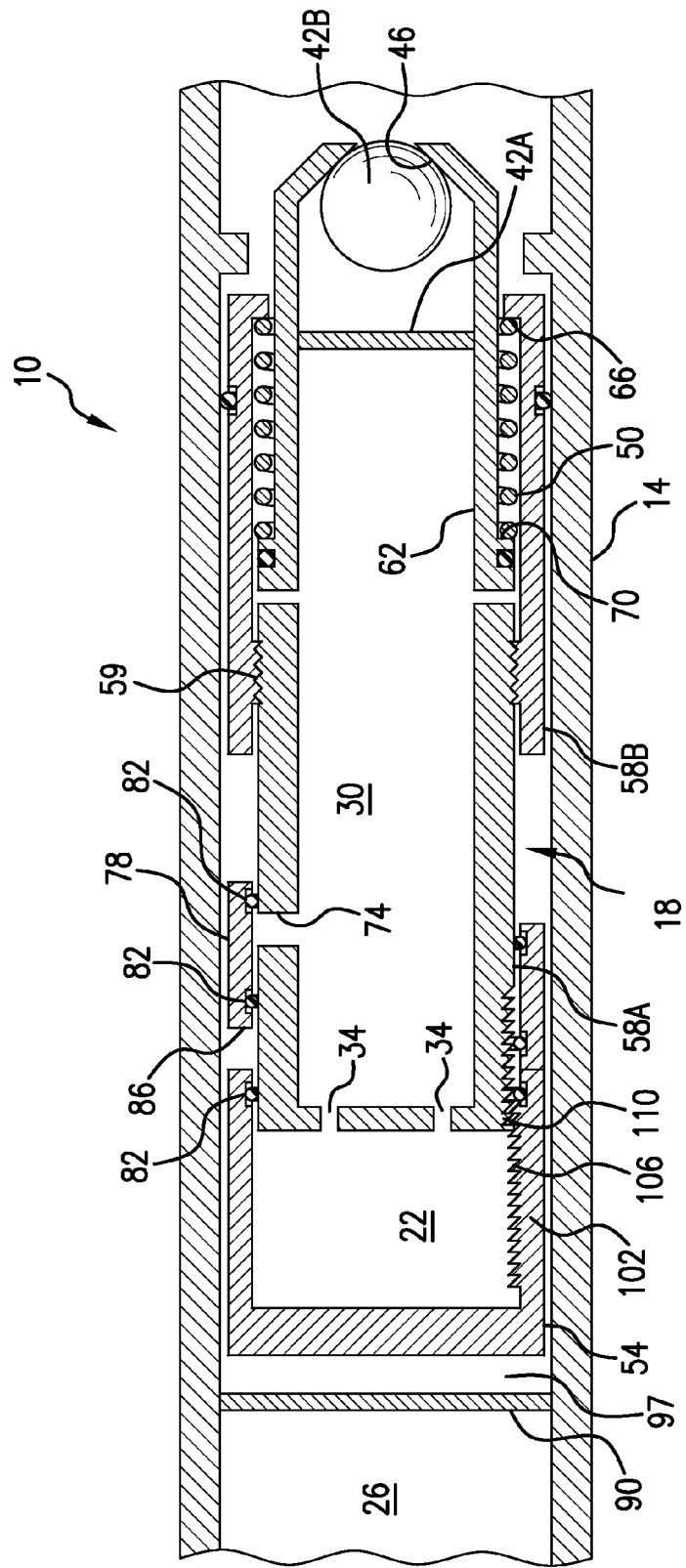
FIG. 1 depicts a cross sectional view of a tubular occlusion and pressure damping system disclosed herein.

Referring to FIG. 1, an embodiment of a tubular occlusion and pressure damping system is illustrated at 10. The system 10 includes, a tubular 14, an occlusion 18 positioned within the tubular 14 configured to at least temporarily block flow through the tubular 14. The occlusion 18, among other things, includes a first chamber 22 in pressure communication with an inside 26 of the tubular 14, and a second chamber 30 in fluidic communication with the first chamber 22 through a flow restrictor 34. The flow restrictor 34 is configured to throttle flow between the first chamber 22 and the second chamber 30. As such, pressure rise within the second chamber 30 is maintained at a lower pressure than in the inside of the tubular 26 until at least one of the volume of the first chamber 22 has reached a selected volume or the volume of the second chamber 30 has reached a selected volume. The selected volume for the first chamber 22 could be substantially zero if the cap 54 is designed to bottom out against the first mandrel 58A. Regardless of which of the chambers 22, 30 volume reaches the selected volume, once reached pressure within the second chamber 30 increases toward pressure on the inside 26 of the tubular 14 (which is the same as pressure within the first chamber 22).

The maximum pressure that can be attained within the second chamber 30 is in part limited by an optional first plug 42A, and/or optional second plug 42B positioned within the second chamber 30. The plug 42A, 42B is defeatable or removable at a selectable threshold pressure. The threshold pressure and how it is set depends upon the configuration of the plug 42A, 42B. In one embodiment the plug 42A can be a load failing member such as a burst disk. In another embodiment the plug 42B can be a ball or other shaped element that is sealable against a seat 46 until the threshold pressure is reached that causes the ball 42B to be released from the seat 46 by the seat 46 deforming or shifting, the ball 42B deforming, or both. In embodiments having the plug 42B extrude through the seat 46, the plug 42B can be employed to perform other tasks.

Pressure within the second chamber 30 can be set, at least in part, by a biasing member 50. The biasing member 50 is illustrated in this embodiment as a compression spring although other embodiments are contemplated including a cavity containing a compressible fluid, for example. The biasing member 50 acts in a direction that opposes expansion of the second chamber 30. As such, pressure needs to increase within the second chamber 30 to compress the biasing member 50 to allow the second chamber 30 to increase in volume. The biasing member 50 also prevents undesired and/or premature expansion of the volume of the second chamber 30.

In the embodiment of FIG. 1, the first chamber 22 of the occlusion 18 is formed by a cap 54 that sealingly slidably engages with a first mandrel 58A. The second chamber 30 is formed by the first mandrel 58A and a second mandrel 58B that is sealingly slidably engaged with a sleeve 62. The mandrels 58A and 58B are sealed and engaged to one another at threads 59. The biasing member 50 is compressed between the second mandrel 58B and the sleeve 62 when the sleeve 62 moves away from the second mandrel 58B. Pressure increases in the inside 26 of the tubular 14 urge the cap 54 toward the first mandrel 58A causing fluid to flow through the flow restrictor 34 from the first chamber 22 to the second chamber 30 compressing the biasing member 50 in the process. Movement between the mandrels 58A, 58B and the sleeve 62 is stopped when shoulders 66 on the second mandrel 58B contact shoulders 70 on the sleeve 62 or alternatively when the biasing member 50 is fully compressed. This also limits expansion of the second chamber 30 and defines the selected volume thereof. An opening 74 in the first mandrel 58A is initially covered by a portion 78 of the cap 54 and seals 82 that prevent flow through the opening 74 until the second chamber 30 has nearly reached the selected volume. At this point a port 86 in the portion 78 aligns with the opening 74 thereby allowing unobstructed flow from the inside 26 of the tubular 14 to the second chamber 30. After the plug 42A, 42B has been defeated or removed (as discussed above) fluid is free to flow through the tubular 14 by flowing from the inside 26, through the opening 74 and past the defeated or removed plug 42A, 42B.

An optional third plug 90 that is also defeatable or removable, shown in one embodiment as a rupture disk, can be employed within the tubular 14. The third plug 90 prevents pressure from acting on the occlusion 18 until defeat or removal thereof. The third plug 90 can therefore allow a pressure event, such as an actuation or a formation treatment, for example, to take place until pressure is built upstream of the plug 90 to a level sufficient to remove the plug 90 is achieved. Prior to removal of the plug 90 a third chamber 97 defined between the plug 90 the cap 54 the mandrels 58A, 58B and the tubular 14 is isolated from pressure upstream of the plug 90. Removal of the plug 90 can create a pressure spike or wave to propagate through the tubular 14. The occlusion 18 disclosed herein prevents the pressure spike or wave from propagating therepast. In alternate embodiments the third plug 90 could be positioned further upstream such as near an end 220 of the tubular 14 as shown in FIG. 2A, for example.

Alignment of the port 86 and the opening 74 can be locked in an aligned position by preventing reverse relative motion between the cap 54 and the first mandrel 58A. A ratcheting arrangement 102, including teeth 106 on the cap 54 and teeth 110 on the first mandrel 58A, allow for the cap 54 to move toward the first mandrel 58A while preventing it from moving in the opposite direction.

Figure 2A:
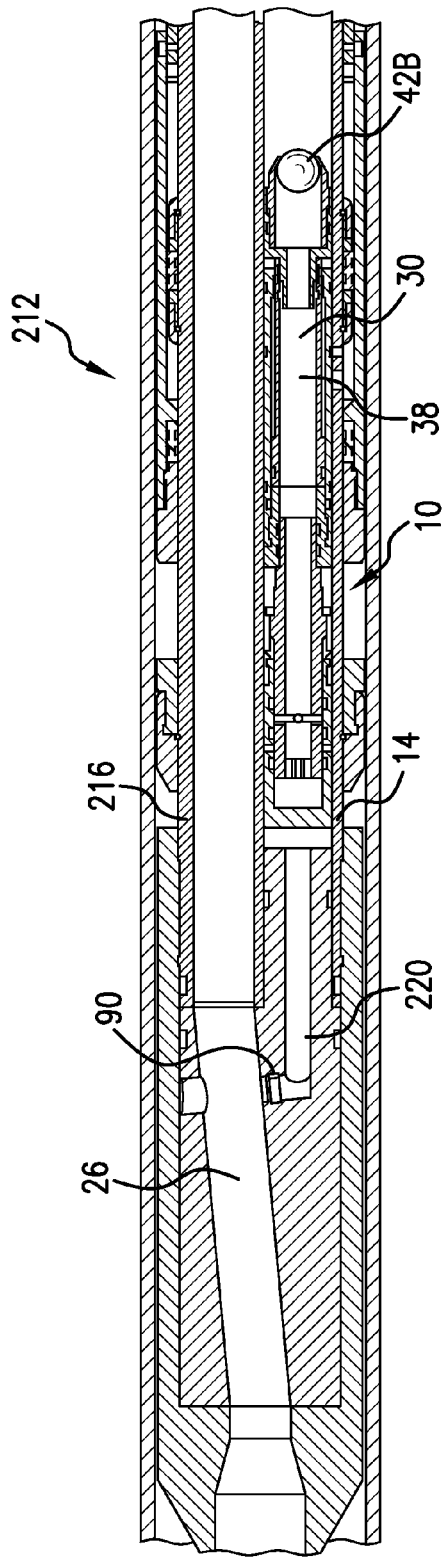
FIGS. 2A and 2B depict a cross sectional view of a temporal pressure controlling arrangement disclosed herein.
Figure 2B:
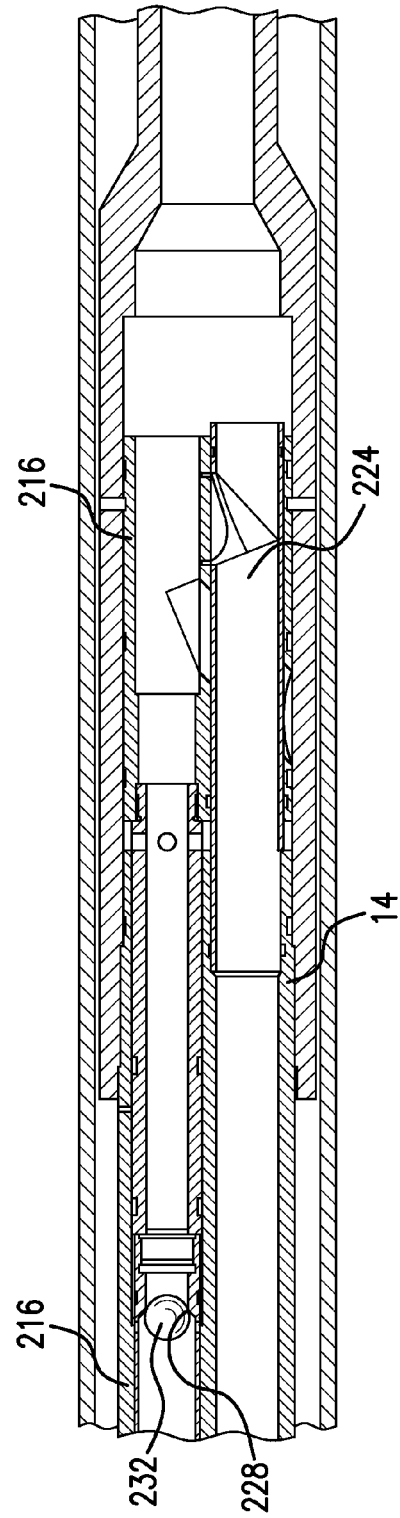

Referring to FIGS. 2A and 2B, a temporal pressure controlling arrangement disclosed herein is illustrated at 212. The arrangement 212 includes, a housing 216 that is in fluidic communication with both ends 220, 224 of the tubular 14 of the tubular occlusion and pressure damping system 10 A seat 228 is positioned within the housing 216 between the ends 220, 224 of the tubular 14, and a fourth plug 232 is sealable against the seat 228. The tubular occlusion and pressure damping system 10 is configured to allow a pressure increase to occur within the housing 216 when the fourth plug 232 lands against the seat 228 without allowing flow through the tubular 14 until the second chamber 30 has achieved the selected volume thereby permitting a pressure increase event to take place within the housing 216 before pressure upstream of the fourth plug 232 within the housing 216 is released through the occlusion 18.

The foregoing structure allows action to be performed in response to the pressure increase event within the housing 216. The action includes but is not limited to at least one of fracturing a formation, treating a formation, actuating a tool, opening a valve, closing a valve, shifting a sleeve, and setting a packer.

One embodiment of the arrangement 212, as illustrated herein, includes the second plug 42B initially positioned within the tubular occlusion and pressure damping system 10 that is releasable into the housing 216 at the end 224 after the second chamber 30 has achieved the selected volume. This released second plug 42B is subsequently available for performing additional actions.

The pressure damping effect within the second chamber 30 provided by the restriction of flow through the flow restrictor 34 allows pressure within the second chamber 30 to be maintained at a lower pressure than the pressure spike that occurs within the housing 216 as the fourth plug 232 seats against the seat 228. This prevents release of the second plug 42B until the second chamber 30 has reached the selected volume.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. does not denote a limitation of quantity, but rather denotes the presence of at least one of the referenced item.

What is claimed is:

1. A tubular occlusion and pressure damping system, comprising:
   a tubular; and
   an occlusion configured to block flow through the tubular, the occlusion comprising:
      a first chamber in pressure communication with an inside of the tubular exterior of the occlusion, the first chamber partially enclosed by a cap;
      a second chamber in fluidic communication with the first chamber the second chamber partially enclosed between a mandrel and a sleeve; and
      a flow restrictor in operable communication with the first chamber and the second chamber configured to throttle flow between the first chamber and the second chamber;
   wherein increased pressure within the inside of the tubular exterior of the occlusion moves the cap relative to the mandrel to decrease a volume of the first chamber, force fluid from the first chamber to the second chamber through the flow restrictor, and increase a volume of the second chamber due to sliding engagement between the mandrel and sleeve, and pressure increases within the second chamber lag behind pressure increases in the inside of the tubular exterior of the occlusion at least until the second chamber has reached a selected volume after which pressure within the second chamber increases toward the pressure in the inside of the tubular exterior of the occlusion.

2. The tubular occlusion and pressure damping system of claim 1, wherein a biasing member resists increases in volume of the second chamber.

3. The tubular occlusion and pressure damping system of claim 2, wherein pressure within the second chamber during volume expansion thereof is determined at least in part by the biasing member.

4. The tubular occlusion and pressure damping system of claim 1, further comprising at least one plug located at the occlusion that prevents flow through the tubular past the occlusion until a threshold pressure is achieved within the second chamber.

5. The tubular occlusion and pressure damping system of claim 4, wherein the threshold pressure is determined by pressure that causes a load failing member to fail.

6. The tubular occlusion and pressure damping system of claim 5, wherein the load failing member is a rupture disk.

7. The tubular occlusion and pressure damping system of claim 4, wherein the threshold pressure is determined at least in part by pressure required to release the at least one plug from the occlusion.

8. The tubular occlusion and pressure damping system of claim 1, further comprising at least one opening in the second chamber that is uncovered as the first chamber or the second chamber nears the selected volume, the at least one opening being configured to allow free flow between the inside of the tubular, exterior of the occlusion, and the second chamber.

9. The tubular occlusion and pressure damping system of claim 1, wherein the selected volume of the second chamber is determined mechanically by contact between the mandrel and the sleeve that form at least portions of the second chamber.

10. A temporal pressure controlling arrangement, comprising a housing being in fluidic communication with both a first end and a second end of the tubular of the tubular occlusion and pressure damping system of claim 1, the temporal pressure controlling arrangement being configured to allow a pressure increase event to take place within the housing at least until the second chamber reaches the selected volume.

11. The temporal pressure controlling arrangement of claim 10, further comprising:
    a seat positioned within the housing between the first end and the second end of the tubular; and
    a second plug sealable against the seat, the temporal pressure controlling arrangement being configured to allow a pressure event to occur within or upstream of the housing after the second plug lands against the seat without allowing flow through the tubular until the second chamber has achieved the selected volume.

12. The temporal pressure controlling arrangement of claim 10, wherein the pressure increase event includes at least one of fracturing a formation, treating a formation, actuating a tool, opening a valve, closing a valve and setting a packer.

13. The temporal pressure controlling arrangement of claim 12, wherein pressure within the second chamber is maintained at a lower pressure than pressure within the housing while volume within the second chamber is increasing.

14. The tubular occlusion and pressure damping system of claim 1, further comprising a plug configured to prevent pressure inside of the tubular, exterior of the occlusion, from reaching the first chamber until removal of the plug.

15. The tubular occlusion and pressure damping system of claim 1, further comprising a ratcheting arrangement configured to prevent increases in volume of the first chamber after the volume of the first chamber has been decreased.

16. The tubular occlusion and pressure damping system of claim 15, wherein the ratcheting arrangement includes teeth on the cap and teeth on the mandrel.

17. A temporal pressure controlling arrangement, comprising:
    a tubular occlusion and pressure damping system including:
        a tubular;
        an occlusion configured to block flow through the tubular, the occlusion including:
            a first chamber in pressure communication with an inside of the tubular, exterior of the occlusion;
            a second chamber in fluidic communication with the first chamber; and
            a flow restrictor in operable communication with the first chamber and the second chamber configured to throttle flow between the first chamber and the second chamber such that pressure increases within the second chamber lag behind pressure increases in the inside of the tubular, exterior of the occlusion, at least until the second chamber has reached a selected volume after which pressure within the second chamber increases toward the pressure in the inside of the tubular, exterior of the occlusion;
    a housing in fluidic communication with both a first end and a second end of the tubular of the tubular occlusion and pressure damping system;
    a seat positioned within the housing between the first end and the second end of the tubular; and
    a second plug sealable against the seat, the temporal pressure controlling arrangement being configured to allow a pressure event to occur within or upstream of the housing after the second plug lands against the seat without allowing flow through the tubular until the second chamber has achieved the selected volume; and,
    a third plug initially positioned within the tubular occlusion and pressure damping system that is releasable from the tubular occlusion and pressure damping system after the second chamber has achieved the selected volume;
    the temporal pressure controlling arrangement being configured to allow a pressure increase event to take place within the housing at least until the second chamber reaches the selected volume.

* * * * *